Patented Nov. 13, 1945

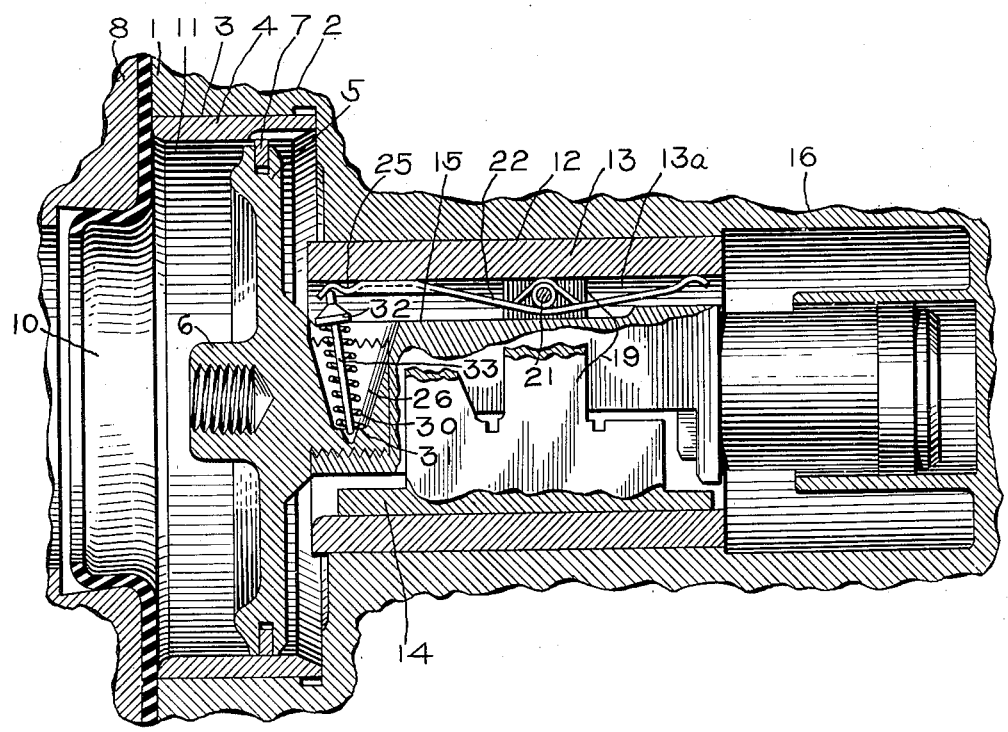

2,389,048

UNITED STATES PATENT OFFICE 2,389,048

BRAKE VALVE DEVICE

Ellis E. Hewitt, Edgewood, Pa., assignor to The Westinghouse Air Brake Company, Wilmerding, Pa., a corporation of Pennsylvania Application March 31, 1943, Serial No. 481,324

1 Claim. (Cl. 303—1)

This invention relates to valve devices and more particularly to the type embodying a piston arranged to be moved by a differential between fluid pressures acting on its opposite sides.

In air brake devices, such as employed on railway vehicles, pistons are employed for operation upon a change in air pressure in a control pipe and thereby on one side of the piston, to effect an application of the brakes on the vehicle, a release of the brakes, or other desired brake controlling operations. The pistons are arranged to reciprocate in cylinder bores and, in accordance with usual practice the pistons comprise piston heads of a diameter somewhat less than that of the bores and each head is therefore provided with a ring groove carrying a ring which is expanded into contact with the wall of the respective bore to provide a leak tight seal between the piston and the wall.

Due to the fact that the diameter of a piston head such as above described is slightly less than that of the bore in which it operates, the piston head is capable of a certain degree of radial movement relative to the ring and the wall of the piston bore. This relative movement is slight and resisted by friction between the ring and the side walls of the ring groove in the piston head. Nevertheless, in a brake device applied to a railway vehicle which at times is subject to severe shocks, due for instance to the vehicle wheels striking uneven joints between the rails in a track, the resulting vibrations set up in the vehicle are liable to cause such relative movement between a piston head and the wall of the bore in which it operates as to undesirably create hammer-like blows between the piston head and said wall. In time these blows may result in a groove being worn in the wall of the bore at either side of the ring where the piston head comes in contact with said wall. If the piston is arranged with its axis horizontal the grooves may be worn only in one side of the cylinder wall, but if its axis is vertical, the grooves may extend completely around the wall. In brake controlling valve devices such as the "AB" and other types of devices, this grooving of the piston cylinder wall is most likely to occur in the brake release position of the piston since the piston occupies this position for the major portion of the time that a vehicle is in use.

This grooving of a cylinder wall is of course very objectionable, particularly in air brake devices, because it tends to create or increase leakage of fluid under pressure from one side of the piston to the other and thereby reduce its sensitivity to variations in fluid pressure on one side thereof, and in case the leakage becomes sufficiently great, it might even result in failure of the piston to respond to a normal variation in fluid pressure. Moreover, the piston head or ring is liable to catch on a side of the grooves worn in the bore and as a consequence require a greater than normal pressure differential to start it moving out of its release position. In such case, when it does start moving, it might then jump or over travel a desired position and thereby cause an undesired operation.

One object of the invention is to provide novel means which will eliminate the above mentioned difficulty.

Another object of the invention is to provide novel means for holding a piston head against radial movement relative to the wall of the bore in which it is disposed for operation.

Other objects and advantages will be apparent from the following more detailed description of the invention.

The accompanying drawing is a sectional view of a portion of a fluid pressure brake device embodying one form of the invention.

General description

This embodiment of the invention is shown in the drawing as being associated with a portion or portions of a brake controlling valve device 1 which for the purpose of illustration may be of the well known "AB" type disclosed in Patent 2,031,213, issued to Clyde C. Farmer on February 18, 1936. Only such parts of the "AB" brake controlling valve device which are pertinent to the invention are, however, shown in the drawing and the following description of such parts will also be limited to only that deemed essential to a clear and comprehensive understanding of the invention.

As shown in the drawing, the brake controlling valve device 1 comprises a casing 2 having at one end a bore 3 which is lined with a bushing 4 having in turn a bore in which is slidably mounted a piston 5. The piston 5 comprises a piston head 6 of a diameter slightly less than that of the bore in the bushing 4. The piston head 6 is provided around its periphery with a groove in which there is mounted a ring 7 expanded into contact with the wall of said bore, the ring being provided to prevent leakage of fluid under pressure from one side of the piston to the opposite side.

The bore in bushing 4 is open at one end of the casing 2 and this open end is closed by a cover 8. In the "AB" valve device disclosed in the patent above referred to, the cover member 8 constitutes a pipe bracket for supporting the casing 2 and through this pipe bracket, by way of a passage 10, communication is established between the usual brake pipe (not shown) on a vehicle and a chamber 11 provided between the piston 5 and the cover member 8.

At the opposite side of the piston 5 there is a valve chamber 12 which is lined with a bushing 13. This bushing in turn is provided with a bore 13a having formed therein a seat upon which a slide valve 14 is slidably mounted. The slide valve 14 is operated by a stem 15 carried by the piston 5, which stem extends through the bore in bushing 13 into a bore in a cover member 16 wherein the end of the stem is supported and arranged to slide upon reciprocation of piston 5.

In the drawing the piston 5 is shown in its release position which it occupies for the major portion of the time that a railway vehicle is in use. The piston 5 is arranged to move from this position its full traverse in the direction of cover member or pipe bracket 8 upon a reduction in pressure of fluid in piston chamber 11 and to move back to the position in which it is shown upon a subsequent increase in pressure of fluid in chamber 11.

According to this embodiment of the invention, the slide valve 14 is provided with a pair of spaced upwardly extending lugs 19, one of which is disposed at each side of the piston stem 15. Rockably mounted at a point substantially intermediate its ends on a pin 21 carried by the lugs 19 is a leaf spring 22. This spring is disposed longitudinally of the slide valve and is constructed and arranged so that each end of the spring has sliding contact with the bushing and exerts a downward force on the slide valve to maintain said slide valve in engagement with its seat in the bushing 13. The leaf spring 22 is provided, at the end adjacent the piston head 6, with an integrally formed extension or finger 25.

Adjacent the piston head 6, the piston stem 15 is provided with a V-shaped recess or pocket 26. Contained in this recess or pocket 26 is a spring 30. This spring is initially compressed and is interposed between a shoulder 31 formed adjacent the bottom of said recess and a shoulder 32 formed on a member 33 which has rocking engagement at one end with the under side of the extension or finger 25.

When these parts are assembled as shown in the drawing it will be noted that the spring 30 acts, through the medium of stem 15, to urge the piston head 6 radially downward into contact with a portion of the bushing 4. The force of the spring 30 thus applied to the piston head 6 is such as to hold said head against radial movement relative to the bushing 4 to avoid grooving of said bushing under vibrating conditions such as above described.

Summary

It will be seen that various novel arrangements embodying pressure exerting means such as springs have been provided for applying a radially acting force to a piston head for biasing same into contact with one side of the wall of the piston cylinders or bore in which it is arranged to reciprocate, with a force sufficient to prevent relative movement between the piston head and the wall due to vibration of the device incident to shocks to which it is subjected in service. Grooving of the cylinder wall and consequently failure of a device to operate as intended will thereby be avoided.

Having now described my invention, what I claim as new and desire to secure by Letters Patent is:

In combination, a casing having a piston bore, a piston head mounted to reciprocate in said bore, a valve chamber disposed on one side of said piston head, a stem projecting from one face of said piston and extending through said valve chamber, means supporting the end of said stem in coaxial relation with said bore, a slide valve disposed in said valve chamber and operatively connected to said stem, a leaf spring, carried by said slide valve and having sliding contact with a wall of said valve chamber for urging said slide valve against its seat, an extension carried by said leaf spring, and pressure exerting means interposed between said extension and said stem and acting on said stem to urge said head radially against the wall of said bore.

ELLIS E. HEWITT.